(12) United States Patent
Wang (10) Patent No.: US 8,007,625 B2
(45) Date of Patent: Aug. 30, 2011

(54) METHOD OF MOUNTING GRIP JACKET TO HANDLEBAR

(75) Inventor: Yung-Han Wang, Taichung Hsien (TW)

(73) Assignee: High Cedar Enterprise Co., Ltd., Taichung Hsien (TW)

( * ) Notice: Subject to any disclaimer, the term of this patent is extended or adjusted under 35 U.S.C. 154(b) by 285 days.

(21) Appl. No.: 12/463,542

(22) Filed: May 11, 2009

(65) Prior Publication Data

US 2010/0258239 A1    Oct. 14, 2010

(51) Int. Cl.
*B29C 65/00* (2006.01)
*B32B 37/00* (2006.01)
*B25G 1/00* (2006.01)

(52) U.S. Cl. ........ 156/289; 156/192; 156/293; 156/294; 156/423; 16/110.1; 16/421; 29/235; 29/423; 29/450; 473/298; 473/299; 473/549

(58) Field of Classification Search .......... 29/235, 29/423, 450; 16/110.1, 421; 156/192, 230, 156/241, 247, 289, 293, 294, 423; 473/298, 473/299, 549–552
See application file for complete search history.

(56) References Cited

U.S. PATENT DOCUMENTS
4,653,170 A * 3/1987 Kelson ............................ 29/450
* cited by examiner

*Primary Examiner* — Khanh Nguyen
*Assistant Examiner* — Carson Gross
(74) *Attorney, Agent, or Firm* — Browdy and Neimark, PLLC (57) ABSTRACT

A method of mounting a grip jacket to a handlebar includes the steps of sleeving an elongated detachable bagging onto a handlebar, the detachable bagging having a closed first end and a closed second end for preventing the handlebar from entering an inside of the detachable bagging, by making the first end be stopped against a distal end of the handlebar and then gradually pushing the detachable bagging toward the handlebar until the detachable bagging fully covers the handlebar; mounting a grip jacket onto the detachable bagging in such a way that the detachable bagging is located between the grip jacket and the handlebar and the second end is exposed outside; and finally drawing the detachable bagging to remove it from the handlebar.

9 Claims, 11 Drawing Sheets a1) Let the first end of a detachable bagging be stopped against a distal end of the handlebar.

↓ a2) Gradually sleeve the detachable bagging onto the handlebar until the detachable bagging fully covers the detachable baggung.

↓ b) Mount a grip jacket to the external periphery of the detachable bagging, the detachable bagging being located between the grip jacket and the handlebar, the second end being exposed outside.

↓ c) Draw the detachable bagging to remove it.

METHOD OF MOUNTING GRIP JACKET TO HANDLEBAR

BACKGROUND OF THE INVENTION

1. Field of the Invention

The present invention relates generally to grip jackets, and more particularly, to a method of mounting a grip jacket to a handlebar.

2. Description of the Related Art

A conventional sleeve-type grip jacket is mounted to a handlebar by the steps of stretching the hole of the grip jacket manually or mechanically to enable the hole to be larger in diameter than the handlebar and then sleeving the grip jacket onto the handlebar.

However, the aforesaid conventional method is slow in operation and is not applicable to the mass production of handgrips because it needs to stretch the hole of the grip jacket step by step and to push the grip further onto the handlebar step by step. In other words, the conventional method needs complicated steps and long operational time to have worse operational efficiency.

SUMMARY OF THE INVENTION

The primary objective of the present invention is to provide a method of mounting a grip jacket to a handlebar, wherein the method can simplify the processing steps to shorten the operational time.

The foregoing objective of the present invention is attained by the method having steps of sleeving a detachable bagging onto a handlebar, the detachable bagging being elongated and having a closed first end and a closed second end for preventing the handlebar from entering an inside of the detachable bagging, by making the first end be stopped against a distal end of the handlebar and then gradually pushing the detachable bagging toward the handlebar until the detachable bagging fully covers the handlebar; mounting a grip jacket onto the detachable bagging in such a way that the detachable bagging is located between the grip jacket and the handlebar and the second end is exposed outside; and finally removing the detachable bagging from the handlebar.

In light of the above steps, the detachable bagging becomes a lubricant medium between the grip jacket and the handlebar, thus making it easy to sleeve the grip jacket onto the handlebar. In other words, the present invention improves the deficiency of the prior art, i.e. it is not easy for the prior art to sleeve the grip jacket onto the handlebar. Besides, the detachable bagging can be removed straight from the handlebar without any other additional procedures.

DETAILED DESCRIPTION OF PREFERRED EMBODIMENTS

Figure 1:
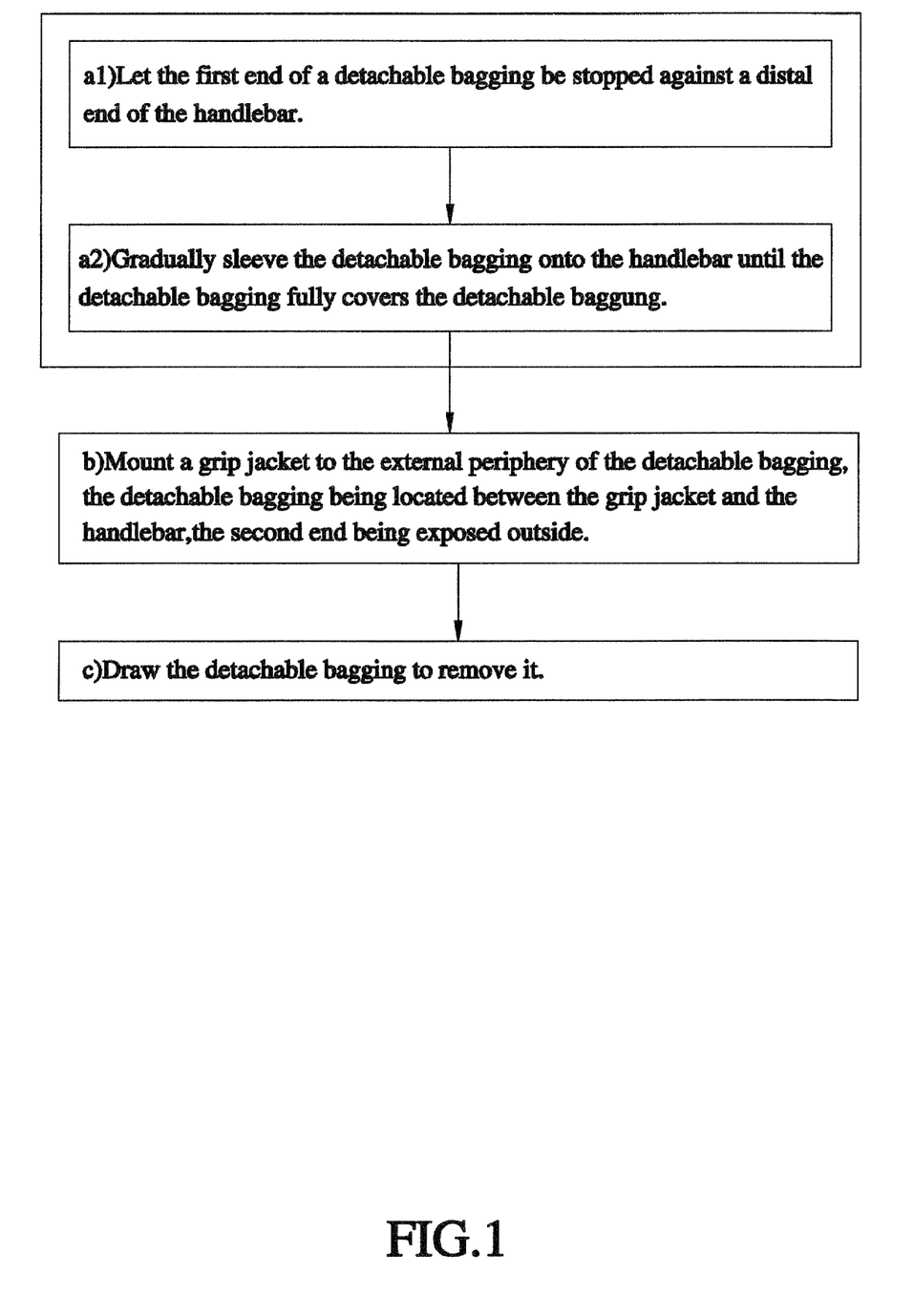
FIG. 1 is a flow chart of a first preferred embodiment of the present invention.
Figure 2:
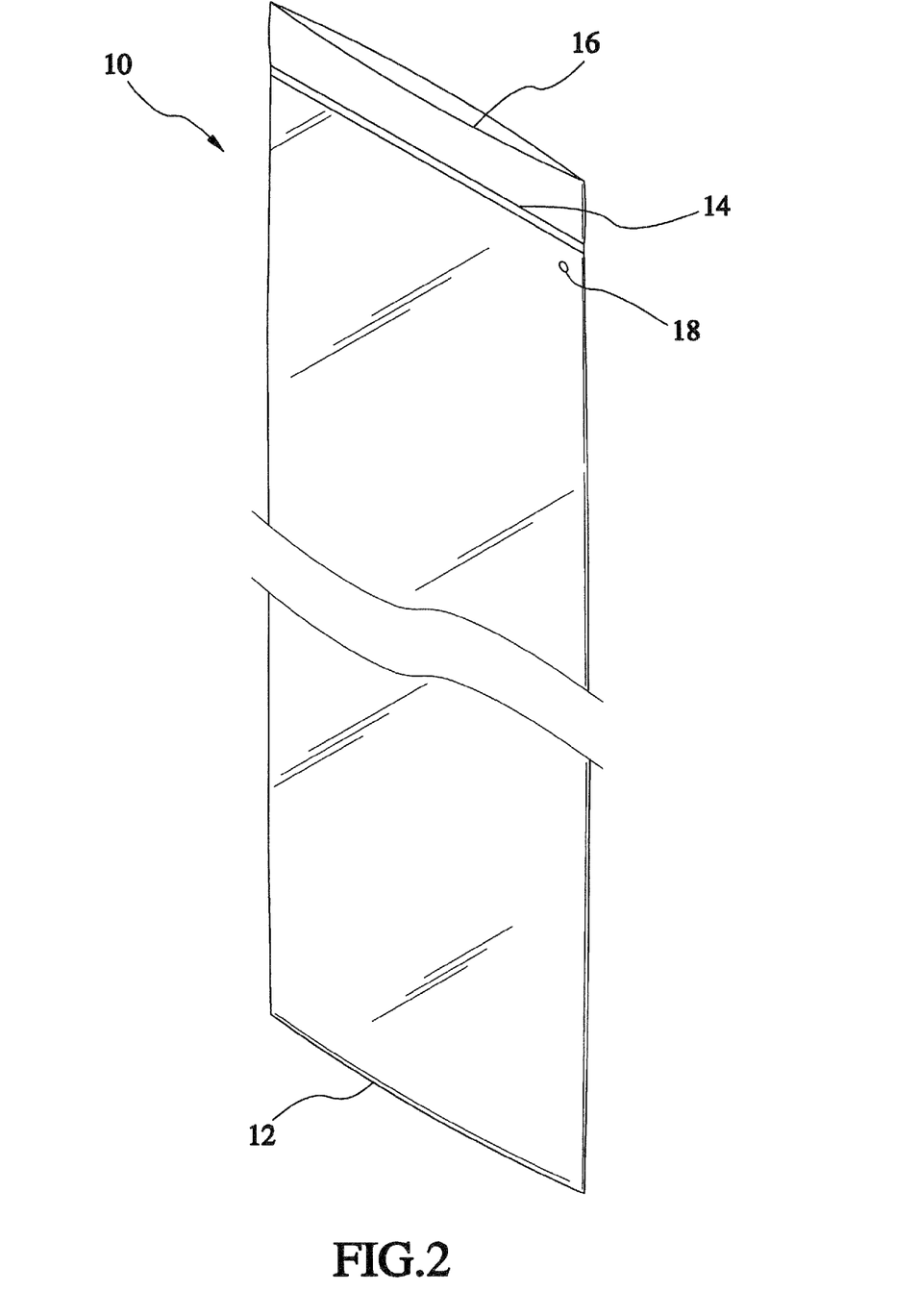
FIG. 2 is a perspective view of a part of a detachable bagging of the first preferred embodiment of the present invention.
Figure 3:
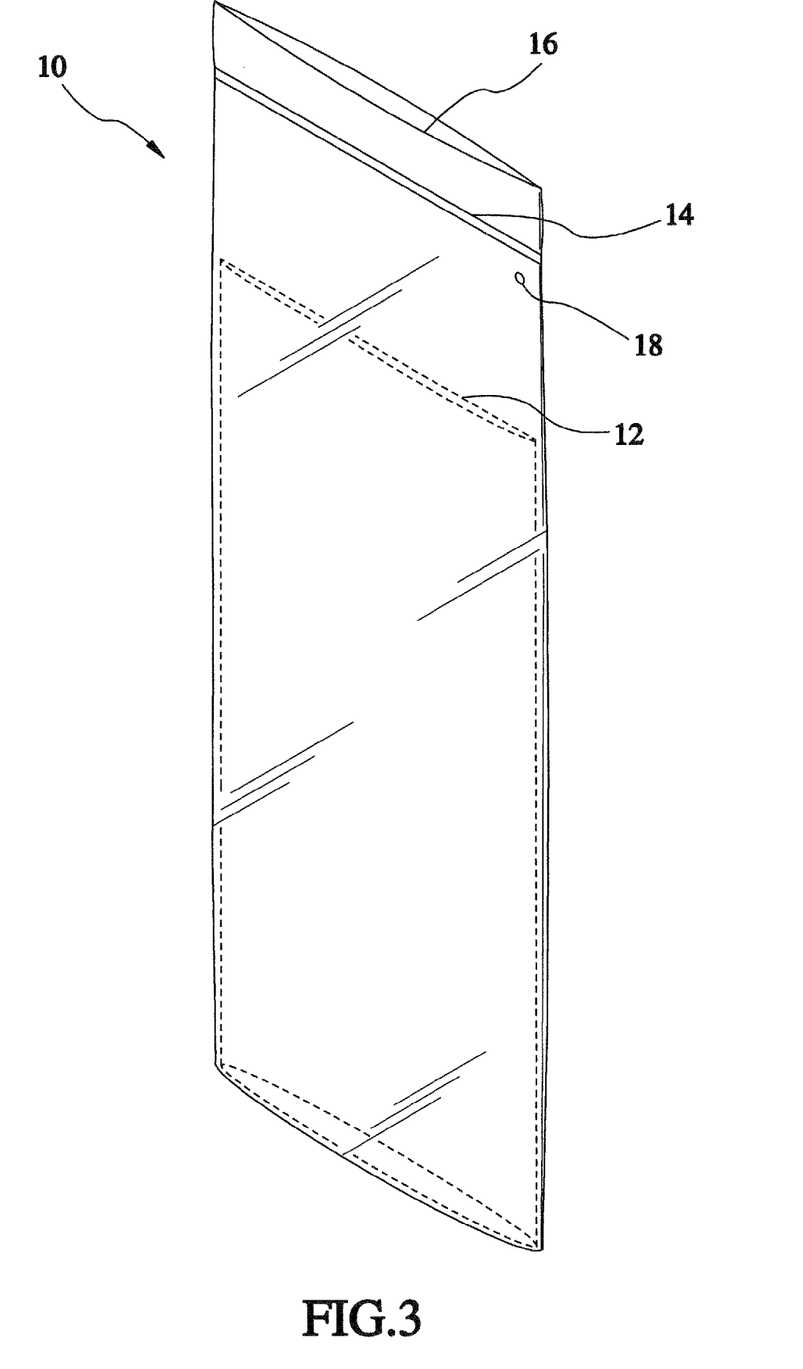
FIG. 3 is a perspective view of the first preferred embodiment of the present invention, illustrating that the first end can be folded inward.
Figure 4:
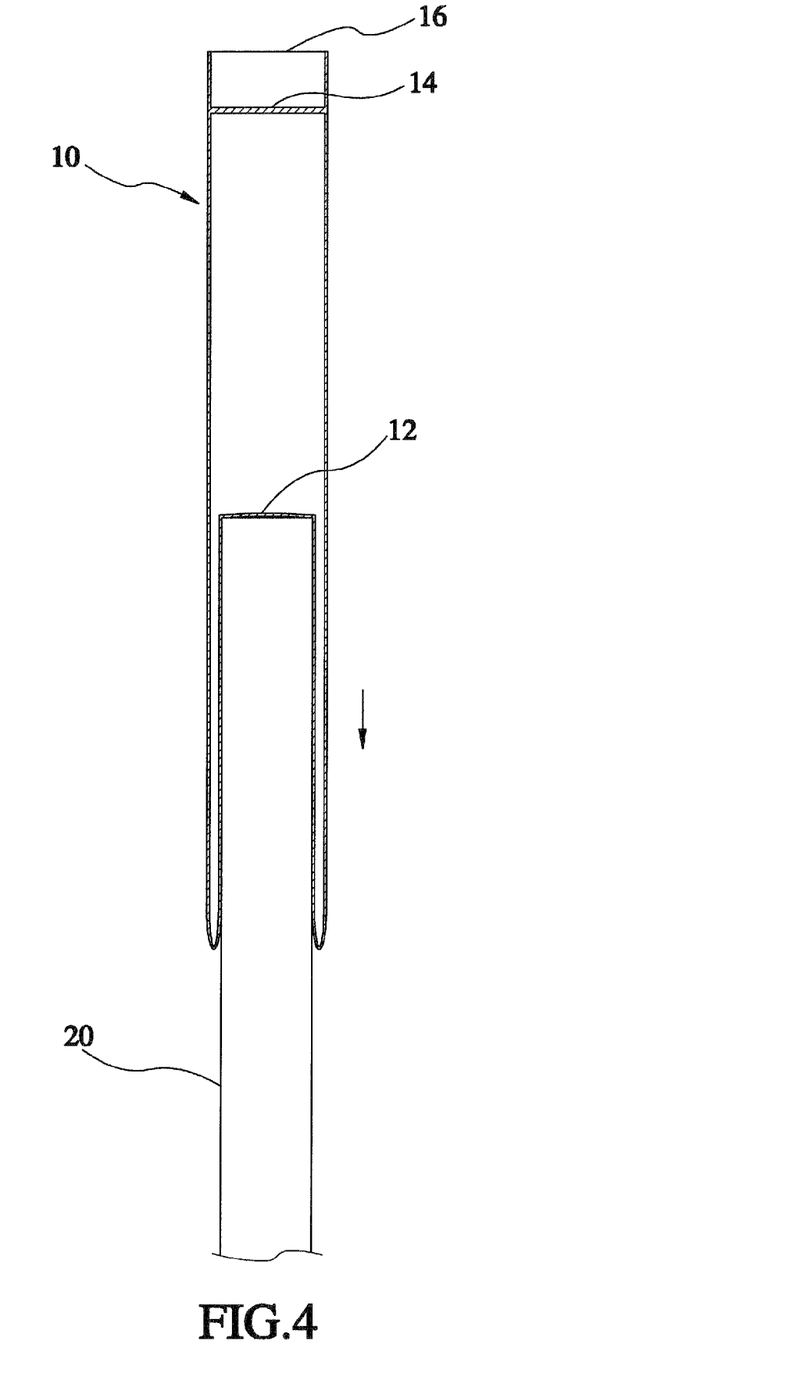
FIG. 4 is a schematic view of the detachable bagging, which is going to be sleeved onto a handlebar.
Figure 5:
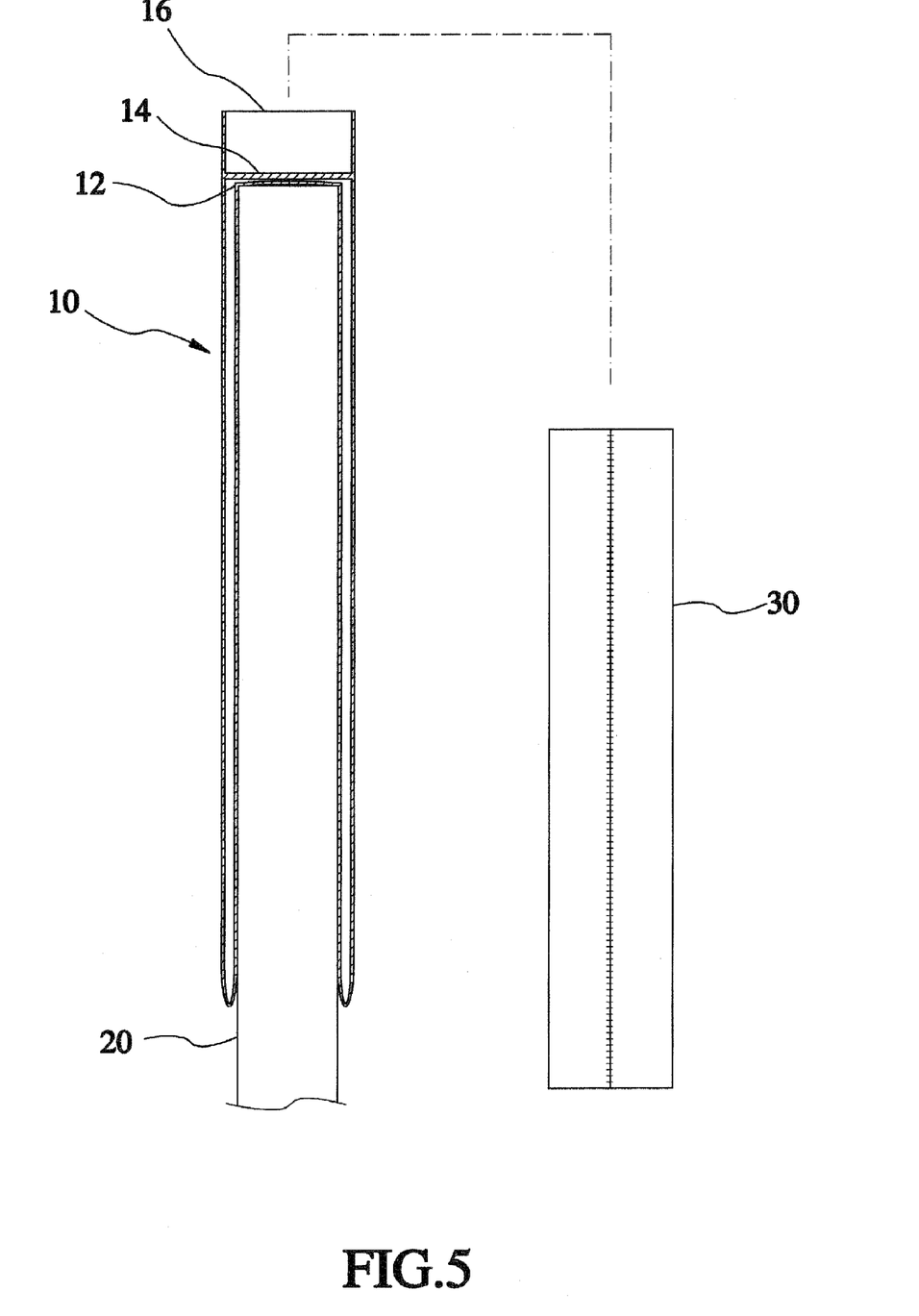
FIG. 5 is similar to FIG. 4, illustrating that the detachable bagging is fully sleeved onto the handlebar and a grip jacket is going to be sleeved onto the detachable bagging.
Figure 6:
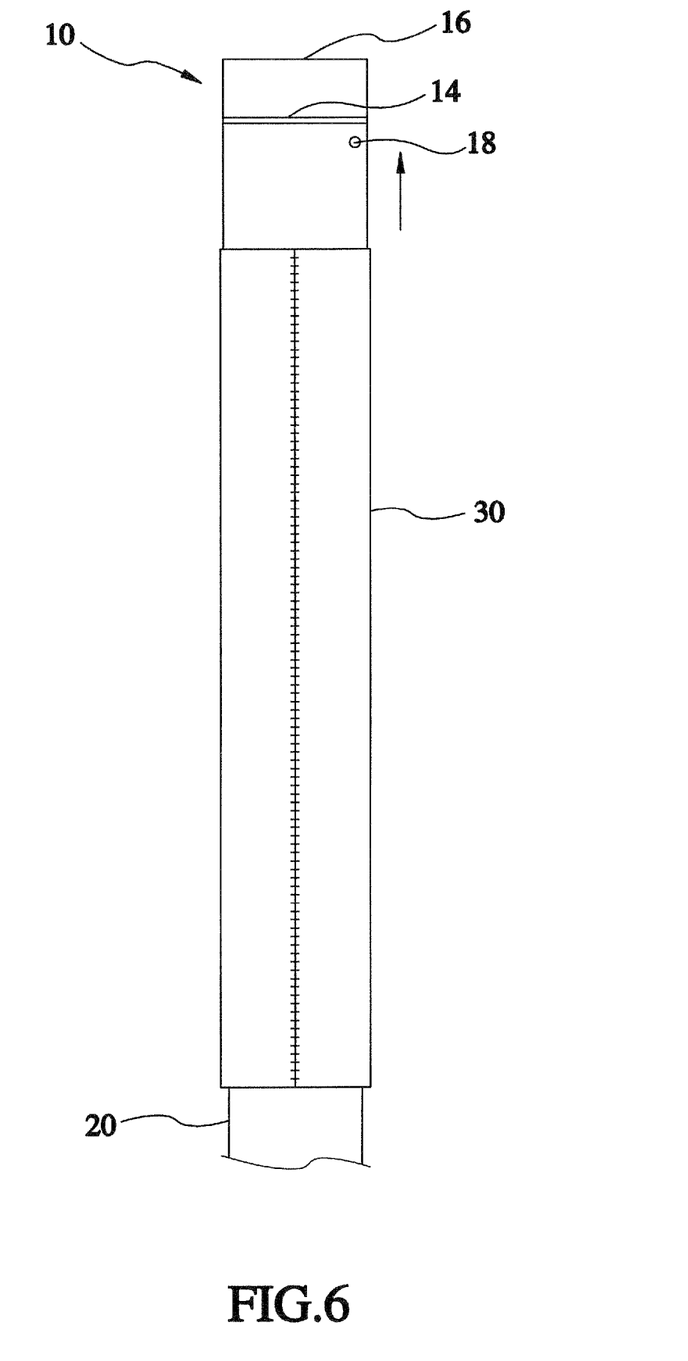
FIG. 6 is a side view of the first preferred embodiment of the present invention, illustrating that the grip jacket is sleeved on the detachable bagging, the detachable bagging is being removed from the handlebar, and a pore is shown on the detachable bagging.
Figure 7:
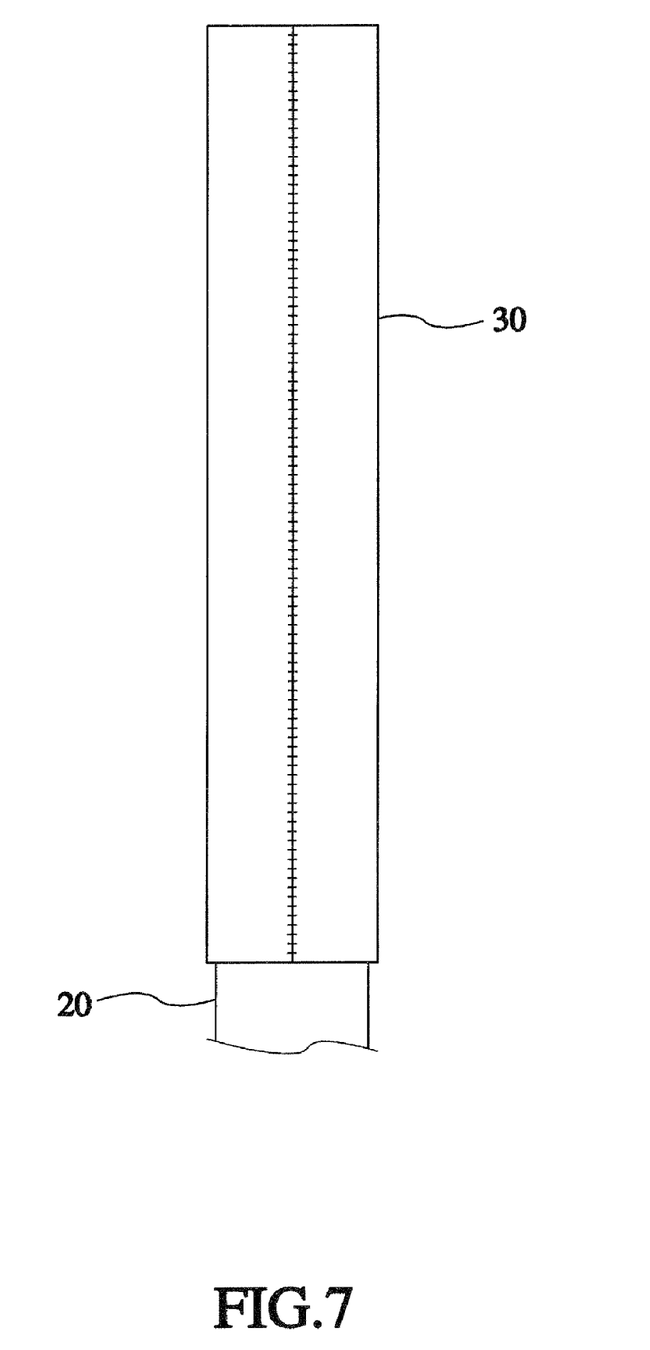
FIG. 7 is similar to FIG. 6, illustrating that the detachable bagging is removed from the handlebar.

Referring to FIG. 1, a method of mounting a grip jacket to a handlebar in accordance with a first preferred embodiment of the present invention includes the following steps.

a) Sleeve a detachable bagging 10 onto a handle bar 20, as shown in FIGS. 2-3. The detachable bagging 10 is elongated and includes a closed first end 12 and a closed second end 14 for preventing the handlebar 20 from entering an inside of the detachable bagging 10. The detachable bagging 10 includes a cap 16 formed on the second end 14 for being drawn to draw the second end and outward to remove the detachable bagging 10 from the handlebar 20. The detachable bagging 10 includes a pore 18 in communication with the inside thereof and the outside thereof for the air therein to exhaust therethrough the detachable bagging 10 in such a way that it is easy to mount the detachable bagging 10 to the handlebar 20. The pre 18 is located close to the second end 14 for facilitating expelling the air inside the detachable bagging 10. In addition, this step can further be divided into two sub-steps as follows.

a1) Let the first end 12 be stopped against a distal end of the handlebar 20. An adhesive material (not shown) is disposed on an external periphery of the handlebar 20 beforehand and can alternatively be glue or double-sided adhesive tape. In this embodiment, the adhesive material is glue.

a2) As shown in FIG. 4, gradually sleeve the detachable bagging 10 onto the handlebar 20 until the detachable bagging 10 fully covers the detachable bagging 10. Where the external periphery of the detachable bagging 10 is close to the first end 12 is attached to the handlebar 20. The detachable bagging 10 at where its external periphery is close to the second end 14 is exposed outside.

b) Referring to FIG. 5, mount a grip jacket 30 to the external periphery of the detachable bagging 10. The second end 14 is exposed outside. The detachable bagging 10 is lubricative to become a lubricant between the detachable bagging 10 and the handlebar 20 in such a way that the detachable bagging 10 can be successfully sleeved onto the handlebar 30. The detachable bagging 10 is located between the grip jacket 30 and the handlebar 20, such that the adhesive material is attached to the detachable bagging 10 without contact with the handlebar 20. In other words, the detachable bagging 10 can temporarily prevent the adhesive material from adherence to other irrelevant articles. The grip jacket 30 can be alternatively sleeve-type or winding-type. In this embodiment, the grip jacket is sleeve-type.

c) Referring to FIG. 6, draw the cap 16 to remove the detachable bagging 10 from the grip jacket 30 and the handlebar 20. When the detachable bagging 10 is being drawn from the grip jacket 30 and the handlebar 20, the adhesive material is gradually adhered to an internal side of the handlebar 30 to fasten the grip jacket 30 and the handlebar 20. As shown in FIG. 7, after the detachable bagging 10 is fully drawn away from the grip jacket 30 and the handlebar 20, the grip jacket 30 is fully mounted to the handlebar 20.

In light of the above steps, the detachable bagging 10 is lubricative to facilitate sleeving the grip jacket 30 onto the handlebar 20. In other words, the method of the present embodiment can overcome the deficiency of the prior art, i.e. it is not easy for the prior art to sleeve the grip jacket onto the handlebar. Besides, the detachable bagging 10 can be directly removed, after processed, without any other additional procedures to have the advantage of convenient operation. Therefore, the present invention is of more simplified steps than the prior art to shorten the operational time.

Figure 8:
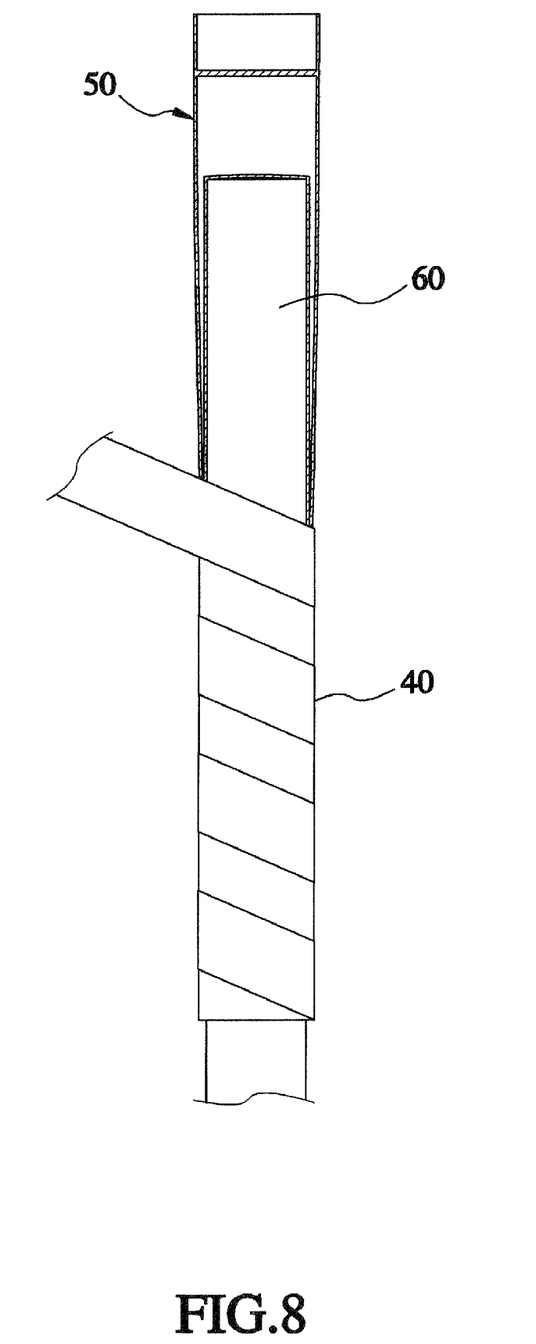
FIG. 8 is a schematic view of a second preferred embodiment of the present invention, illustrating that the detachable bagging is sleeved onto the handlebar and a grip tape is being wound around the detachable bagging.
Figure 9:
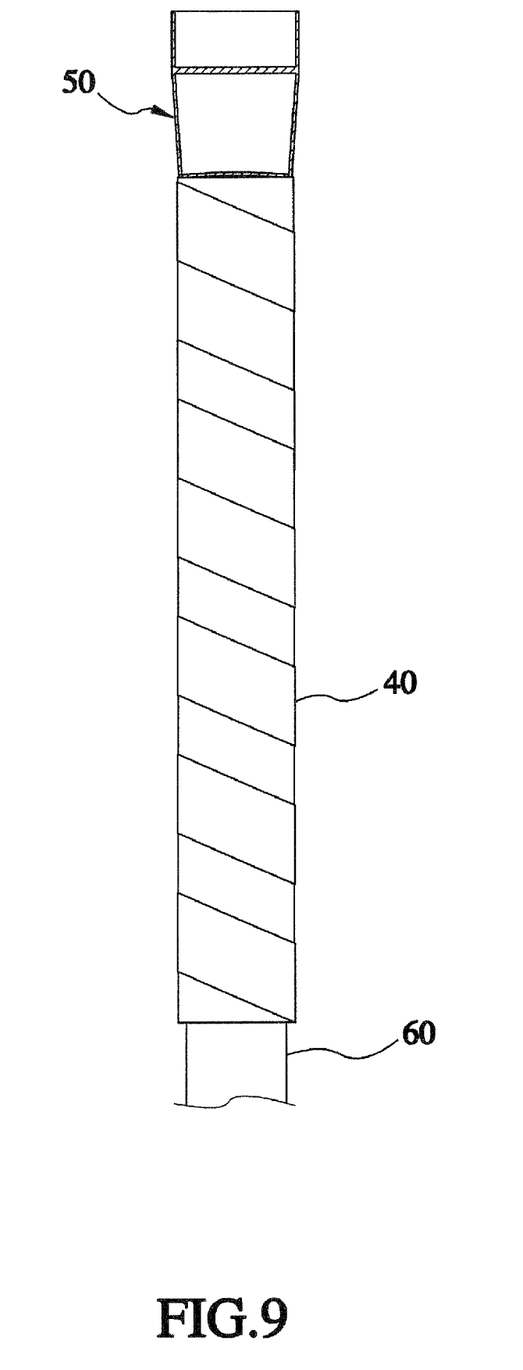
FIG. 9 is similar to FIG. 8, illustrating that the grip tape is wound around the detachable bagging.
Figure 10:
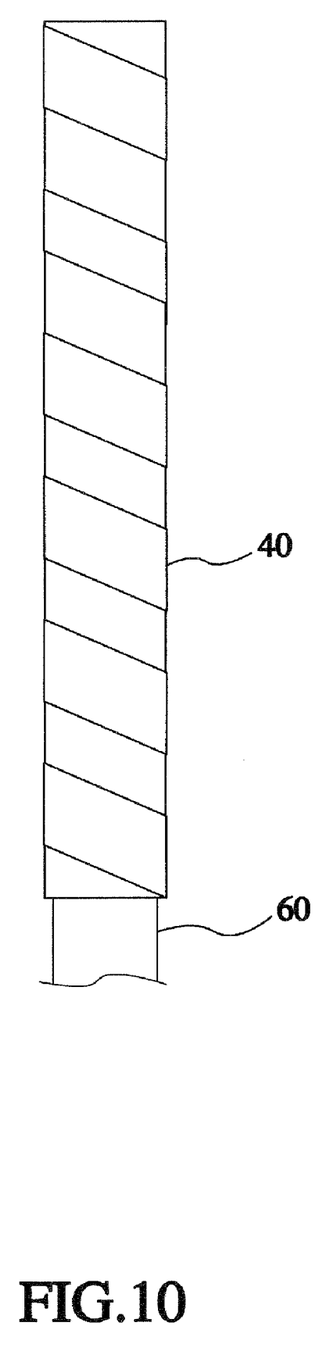
FIG. 10 is similar to FIG. 9, illustrating that the detachable bagging is removed from the handlebar.

Referring to FIGS. 8-10, a method of mounting a grip jacket to a handlebar in accordance with a second preferred embodiment of the present invention is similar to that of the first embodiment, having the difference in the step b) as recited below.

b) As shown in FIGS. 8-9, mount a grip jacket 40 to an external periphery of a detachable bagging 50. The detachable bagging 50 is located between the grip jacket 40 and a handlebar 60. In this embodiment, the grip jacket 40 is winding-type.

In light of the above, as shown in FIG. 10, the method of the second embodiment can reach the same effect as that of the first embodiment does.

Figure 11:
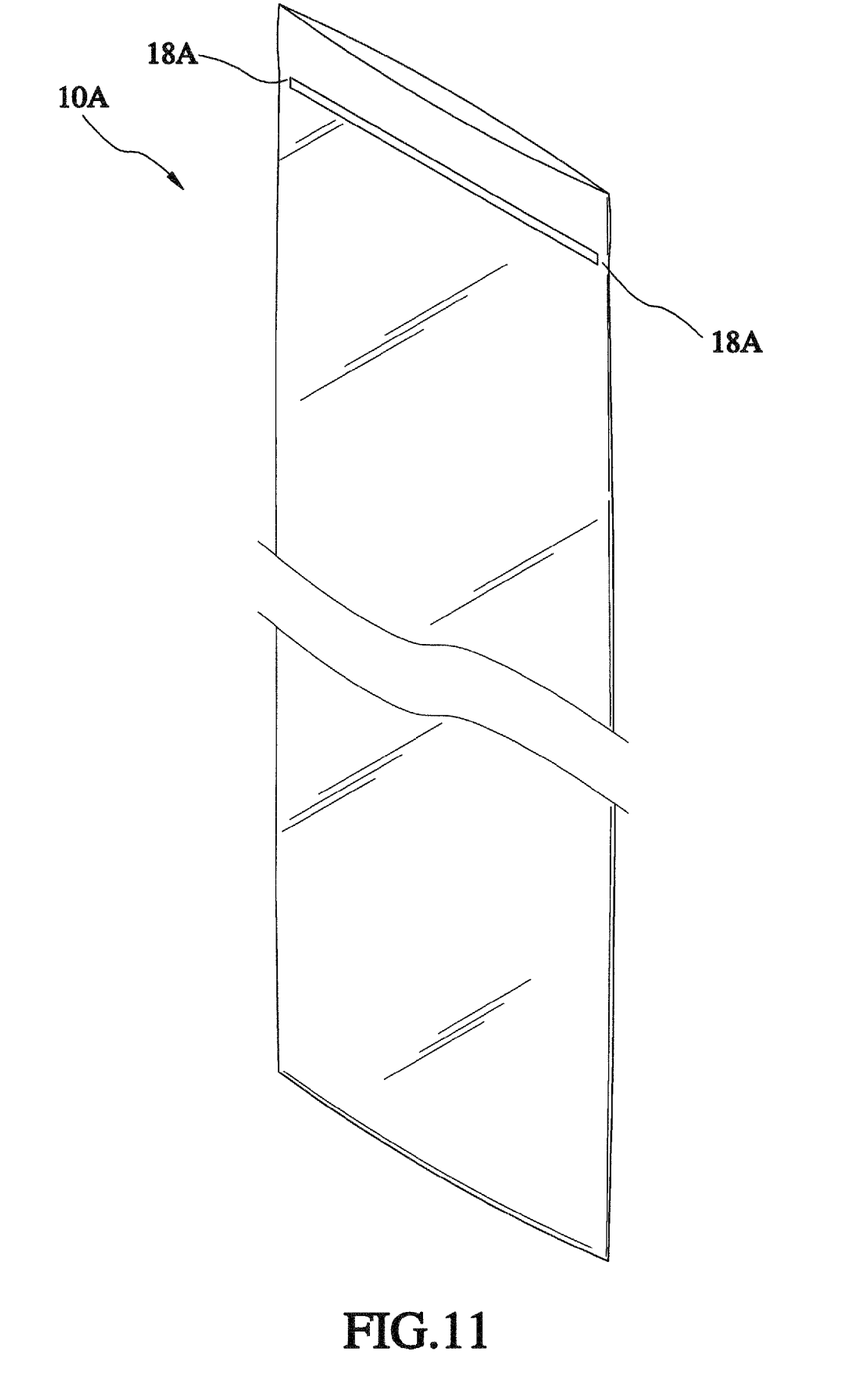
FIG. 11 is a perspective view of a part of the detachable bagging, illustrating where the pore is located.

Referring to FIG. 11, a method of mounting a grip jacket to a handlebar in accordance with a third preferred embodiment of the present invention is similar to but different from that of the first embodiment in that the detachable bagging 10A of the third embodiment includes two pores 18A formed at a hot-press suture thereof. Likewise, the detachable bagging 10A can expel the air therein through the pores 18A. Therefore, the method of the third embodiment can also reach the same effect as that of the first embodiment does.

Although the present invention has been described with respect to specific preferred embodiments thereof, it is no way limited to the details of the illustrated structures but changes and modifications may be made within the scope of the appended claims.

What is claimed is:

1. A method of mounting a grip jacket to a handlebar, comprising steps of:
   a) mounting an elongated detachable bagging to the handlebar, the detachable bagging having a closed first end and a closed second end for preventing the handlebar from entering an inside of the detachable bagging, by making the first end be stopped against a distal end of the handlebar and then gradually sleeving the detachable bagging onto the handlebar until the detach bagging fully covers the handlebar;
   b) mounting a grip jacket to an external side of the detachable bagging in such a way that the detachable bagging is located between the grip jacket and the handlebar and the second end is exposed outside; and
   c) drawing the detachable bagging to remove it from the handlebar and the grip jacket.

2. The method as defined in claim 1, wherein the handlebar in the step a) includes an adhesive material disposed on an external periphery thereof beforehand, the adhesive material being glue or double-sided adhesive tape.

3. The method as defined in claim 1, wherein the detachable bagging in the step a) at where its external periphery is close to the first end is stopped against the handlebar and at where its external periphery is close to the second end is exposed outside.

4. The method as defined in claim 1, wherein the detachable bagging in the step a) comprises a cap formed at the second end for being drawn outward to remove the detachable bagging from the handlebar.

5. The method as defined in claim 1, wherein the detachable bagging in the step a) fully covers the handlebar.

6. The method as defined in claim 1, wherein the detachable bagging in the step a) further comprises a pore in communication with an inside thereof and an outside thereof for the air therein to exhaust therethrough.

7. The method as defined in claim 6, wherein the pore in the step a) is close to the second end of the detachable bagging for the air inside the detachable bagging to exhaust therethrough.

8. The method as defined in claim 6, wherein the pore in the step a) is formed at a hot-press stature of the detachable bagging.

9. The method as defined in claim 1, wherein the grip jacket is sleeve-type or winding-type.

* * * * *